Patented Nov. 27, 1951

2,576,718

UNITED STATES PATENT OFFICE 2,576,718

METHOD OF TESTING FOR THE PRESENCE OF BRINE IN WELLS

Fred R. Holland, Fort Worth, Tex.

No Drawing. Application January 8, 1949,
Serial No. 69,987

3 Claims. (Cl. 23—230)

This invention relates to an improved method for determining the presence of salt water entering wells which have been treated with acid for increasing the permeability of the oil or gas formations.

The use of hydrochloric acid for partially dissolving limestone formations for increasing the flow of oil, gas or water into wells is well known and is not, therefore, herein discussed in detail. The acid treatment of wells referred to for increasing the production of oil or gas sometimes causes the wells to produce water, usually salt water, and referred to as oil well brines. The term "limestone" as used herein includes calcareous rocks and dolomites. During the acid treatment, the non-porous strata between the oil or gas bearing formations and the water bearing formations are sometimes dissolved, allowing the brines to enter the well bore.

After treating a well with hydrochloric acid in the usual manner for increasing the flow of oil, gas or water, the spent acid which has reacted with the limestone formations, together with the brines, if any, entering the well from the earth formations are removed from the well, usually by swabbing, and the liquid thus removed, including the well brines, if any, is used in carrying out the present invention for indicating the presence of brine in the well.

The product of the reaction between hydrochloric acid and limestone produces a calcium chloride solution similar to the salt solutions of the oil well brines. Heretofore involved laboratory tests were required to distinguish between the spent acid and the well brines.

An object of the invention is to provide a simplified means and method of determining whether or not the salt solution in the liquid removed from an acid treated well is the product of the reaction between the hydrochloric acid and the limestone, or if the salt in the liquid is the natural brine produced from a subsurface porous stratum.

A particular object of the invention is to test for the presence of oil well brines by merely applying the liquid and added solution removed from the well after the acidizing treatment to a clean iron or steel object which may be of any shape, but which is preferably in the form of steel strips.

A further object of the invention is to provide an inexpensive testing means for the described purpose.

In carrying out the testing for the presence of brine in an acidized well, a metallic salt not commonly found in formations producing either oil, gas, or water is dissolved in the hydrochloric acid before the same is placed in the well. Any copper salt, such as copper sulphate, copper chloride, copper chlorate, or the like, may be used for this purpose. The metallic salt remains in the acid throughout its reaction with the limestone in the well, and after it has been removed from the well it will identify itself by causing a deposition of copper on an iron or steel surface when enough hydrochloric acid is added to the liquid or suspension removed from the well to cause a chemical reaction with the iron or steel surface. If the suspension has been diluted with well brines, concentration of the copper salt will be decreased, thus preventing the deposit of copper on the iron or steel surface.

The following examples are laboratory proportions, and it is to be understood that the same or similar proportions are to be used in sufficient quantities for acidizing a well:

Example 1

1.5 ounces of copper sulphate are added to one gallon of 10 degree Baumé, or 15% hydrochloric acid. The acid is then neutralized by adding calcium carbonate, magnesium carbonate, or any carbonate conglomerate until the acid has spent itself. (The last referred to step corresponds with the reaction of the acid with the limestone in a well.) Approximately one ounce of the mixture is poured off and approximately one ounce of 18 to 20 degree Baumé hydrochloric acid is added. (The last referred to step corresponds with the adding of acid to the suspension removed from the well.) A strip of iron or steel is then held in the mixture. The reaction between copper salt, hydrochloric acid and iron will cause a precipitate of metallic copper to be formed on the iron or steel if the acid has not been diluted with salt water. If the mixture has been diluted with salt water the precipitate will not appear on the iron or steel.

Example 2

One ounce of copper chloride is added to one gallon of 10 degree Baumé, or 15% hydrochloric acid. The acid is then neutralized by adding calcium carbonate, magnesium carbonate, or carbonate conglomerate until the acid has spent itself. Approximately one ounce of the solution is poured off and approximately one ounce of 18 to 20 degree Baumé hydrochloric acid is added. An iron or steel strip is then placed in contact with the suspension and a precipitate of metallic copper is then formed on the iron or steel. When the same proportions are applied for acidizing a well, and when subsequently carrying out the described test, the presence of oil well brines in the suspension will prevent the precipitation on the iron or steel.

It is to be understood that the foregoing examples are not restrictive, but may be varied within the scope of the appended claims.

What is claimed is:

1. The method of testing for the presence of brine in a well, comprising the steps of: adding 1 to 1½ ounces of copper salt to each gallon of a quantity of 10 degree Baumé hydrochloric acid, spending said acid containing said copper salt by contacting the same with the formation of the well bore, adding 1 ounce of 18 to 20 degree Baumé hydrochloric acid to a gallon sample of the spent acid from the well, and contacting the resulting mixture with a ferrous body whereby a precipitate of copper will appear on said body if said sample does not contain well brines therein.

2. The method of testing for the presence of brine in a well, comprising the steps of: adding 1½ ounces of a copper sulphate to each gallon of a quantity of 10 degree Baumé hydrochloric acid, spending said acid containing said copper sulphate by contacting the same with the formation of the well bore, adding 1 ounce of 18 to 20 degree Baumé hydrochloric acid to 1 gallon sample of the spent acid from the well, and contacting the resulting mixture with a ferrous body, whereby a precipitate of copper will appear on said body if said sample does not contain well brines therein.

3. The method of testing for the presence of brine in a well, comprising the steps of: adding 1 ounce of copper chloride to each gallon of a quantity of 10 degree Baumé hydrochloric acid, spending said acid containing said copper chloride by contacting the same with the formation of the well bore, adding 1 ounce of 18 to 20 degree Baumé hydrochloric acid to 1 gallon sample of the spent acid from the well, and contacting the resulting mixture with a ferrous body, whereby a precipitate of copper will appear on said body if said sample does not contain well brines therein.

FRED R. HOLLAND.

REFERENCES CITED

The following references are of record in the file of this patent:

UNITED STATES PATENTS

| Number | Name | Date |
|--------|------|------|
| 2,472,393 | Avallone | June 7, 1949 |